United States Patent Office 3,647,896
Patented Mar. 7, 1972

3,647,896
SOLUBLE TRANSITION METAL CATALYSTS FOR PREPARING OLEFINS HAVING AN EXOCYCLIC DOUBLE BOND
James E. Lyons, Wallingford, Pa., assignor to Sun Oil Company, Philadelphia, Pa.
No Drawing. Continuation-in-part of application Ser. No. 805,343, Mar. 7, 1969. This application Oct. 31, 1969, Ser. No. 873,092
Int. Cl. C07c 5/24
U.S. Cl. 260—666 A    13 Claims

ABSTRACT OF THE DISCLOSURE

Cyclic hydrocarbons having one or more side chains containing olefinic unsaturation can be isomerized to the corresponding cyclic hydrocarbon containing double bonds exocyclic to the ring through the use of a ligand-stabilized group VIII metal complex in homogeneous solution. The catalyst used has a metal-hydrogen bond or is a complex which, in situ, can either abstract hydrogen from the olefin to form a metal-hydrogen bond, or form such a bond in the presence of added hydrogen. The complexes, which are hydrocarbon-soluble provide a homogeneous rather than a heterogeneous system for this type of reaction. The catalysts also provide a route which makes possible conversion of substituted cyclic olefins to the exocyclic olefin in higher yields than could be realized by other catalytic methods.

CROSS-REFERENCE TO RELATED APPLICATIONS

This application is a continuation-in-part application of U.S. Ser. No. 805,343, filed Mar. 7, 1969.

BACKGROUND OF THE INVENTION

This invention relates to an improved process for isomerizing double bonds from a position on a side chain attached to a cyclic hydrocarbon into a position exocyclic to the ring. More particularly, this invention relates to a process for isomerizing the above-described olefins to compounds having exocyclic double bonds wherein there is employed as the isomerization catalyst a homogeneous system comprising a ligand-stabilized group VIII metal transition metal complex which is hydrocarbon-soluble and which either contains a metal-hydrogen bond or, in situ, is able to abstract hydrogen from the olefin or use added hydrogen to form a metal-hydrogen bond.

The isomerization of vinyl substituted olefins and like compounds to form compounds having an exocyclic double bond is already well known in the art. Thus, for example, U.S. Pat. 3,080,432 teaches the isomerization of 4-vinyl-1-cyclohexene to yield a mixture of its conjugated isomers including 3-ethylidene cyclohexene using sodium on alumina as the catalyst. Similarly, Belgian Pat. 722,817 discloses the isomerization of 5-isopropenyl-2-norbornene to 5-isopropylidene-2-norbornene using alkali metal catalyst. Belgian Pat. 717,118 also involves the formation of ethylidene norbornene from vinyl norbornene using iron or cobalt salts in conjugation with aluminum alkyls at elevated temperatures.

In each of these patents, however, as well as in similar patents which teach the use of acidic, basic or heterogeneous metal catalyst, the reactions are characterized by one or more of the following disadvantages: low recovery, poor selectivity, skeletal rearrangement, aromatization and polymerization. These difficulties were not as pronounced, however, when reactions were restricted to certain bicyclic olefins such as vinylnorbornene and the like.

In contrast to the above, the homogeneous transition metal catalysts used in this invention are both mild, selective and give high yields of exocyclic olefinic products. In addition, the catalysts referred to in this invention may be applied with equal success regardless of whether the starting material is cyclic or bicyclic. The isomerization process referred to in this invention is, therefore, a reaction of general utility and is not restricted to a bicyclic system. Furthermore, it is possible to isomerize an olefin or diolefin in a stepwise manner with the catalysts described in this invention, thus controlling the isomerization to yield a single type of isomer selectively.

SUMMARY OF THE INVENTION

In accordance with the present invention, it has now been found that a homogeneous catalyst system comprising a ligand-stabilized, hydrocarbon-soluble group VIII transition metal complex which either contains a metal-hydrogen bond or has the ability, in situ, to abstract hydrogen from olefinic substrates or use added hydrogen to form a metal-hydrogen bond, may be employed in the isomerization of cyclic compounds having non-exocyclic unsaturation in a side chain to yield the corresponding cyclic compounds wherein the double bonds are shifted to a position which is exocyclic to the ring.

The novel features of this process which serve to distinguish it from the prior art are: (1) the reaction proceeds in homogeneous solution under mild conditions in the presence of soluble group VIII metal-hydride complexes rather than with acid catalysts, basic catalyst or heterogeneous or binary metal catalyst; (2) the reaction is selective in that the isomerization consistently does not proceed beyond the formation of the exocyclic olefin, i.e., little or no aromatization, polymerization or skeletal rearrangement occur; and (3) the isomerization proceeds in a stepwise fashion enabling the selective formation of either conjugated or non-conjugated exocyclic olefins, if more than one double bond is present in the starting material.

DESCRIPTION OF THE INVENTION

As mentioned above, the starting materials employed in this process are cyclic hydrocarbons having one or more unsaturated side chains such as (1) cyclic monoolefins having the site of unsaturation on the side chains; (2) cyclic diolefins having one or both double bonds on the side chains with or without unsaturation in the ring; and (3) multiply-unsaturated compounds having at least one carbon double bond on the side chain, said side chains contain from 2 to 5 carbon atoms, wherein the site of unsaturation is other than exocyclic to the ring. Each of the above classes of compounds may contain substituent groups which are non-reactive under the conditions of this process. Thus, alkyl groups as well as oxygen and some nitrogen- and sulfur-containing functionalities such as —OR, —OCOR, —NR$_2$, —SR or like moieties wherein R is a lower alkyl group having from 1 to 5 carbon atoms, may be attached to the ring or to the side chains thereof. It should be understood that the term "cyclic olefins" is meant to include heterocyclic ring compounds as well, i.e., those containing oxygen, nitrogen or sulfur, as long as such rings are likewise non-reactive under the conditions of this process.

Representative side chains which may be attached to the starting olefins defined above include vinyl, alkyl, butenyl and the like. The isomerization rate is much faster with linear side chains of the type referred to above than with substituted side chains such as isopropenyl and the like.

The only limitations imposed on the structure of the starting materials are that they do not contain: (1) substitutents such as —NH$_2$, —SH and similar groups which may be strongly bound about the metal as ligands to retard the reaction rate and in some cases inhibit reaction completely; or (2) very sterically hindered olefinic materials which prevent coordination by the metal, as for example, isobutenyl-norbornane and the like.

Examples of easily isomerizable materials are such compounds as vinylcyclohexane (Equation 1), vinylcyclopentane (Equation 2), allylcyclohexane (Equation 3), 4-vinyl-1-cyclohexane (Equation 4) and similar materials:

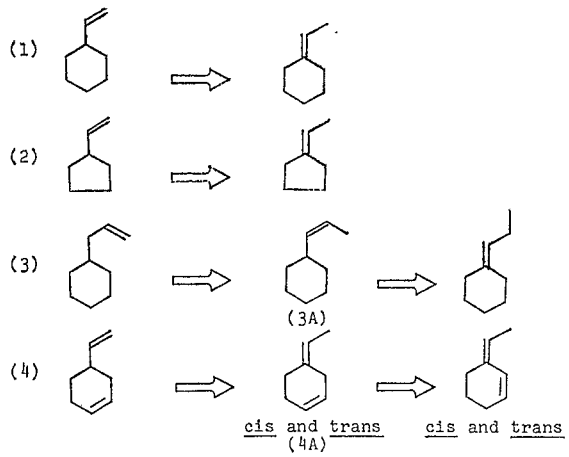

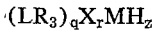

Depending on the catalyst and conditions, the reactions of the type (3) and (4) may be stopped predominantly at stages (3A) and (4A) respectively, where (3A) is 1-cyclohexylpropene-1-.

The catalysts used for the isomerization reaction are hydrocarbon-soluble, coordinatively unsaturated ligand-stabilized transition metal hydride complexes prepared either previous to use, or in situ, which have the formula $(LR_3)_qX_rMH_z$ wherein L is nitrogen, phosphorus or arsenic; R is lower alkyl or mononuclear aryl; X is chlorine, bromine, iodine or $SnCl_3$; M is a group VIII transition metal; H is hydrogen; $q$ is the integer 2 or 3; $r$ is an integer of from 0 to 2; and $z$ is the integer 0 or 1; wherein, when $z$ is 0, the metal hydride complex is formed in situ. The lower alkyl group may contain from 1 to 6 carbon atoms. Preferably $LR_3$ should be a triarylphosphine moiety, although trialkyl phosphine ligands are also effective.

Among the suitable group VIII metals are palladium, platinum, iridium, rhodium, ruthenium and osmium, of which ruthenium and platinum are the most effective.

Examples of some of the catalysts found to be effective are tristriphenylphosphinechlororuthenium (II) hydride,
bistriphenylphosphine(trichlorostannato)platinum (II) hydride,
tristriphenylphosphinecarbonyliridium (I) hydride,
tristriphenylphosphinecarbonylchloroosmium (II) hydride, and the like. Of these, tristriphenylphosphinechlororuthenium (II) hydride and
bistriphenylphosphine(trichlorostannato)platinum (II) hydride are the catalysts of choice.

These and other like group VIII transition metal complexes are known compounds as shown in P. S. Hallman, B. R. McGarvey and G. Wilkinson, J. Chem. Soc. (A), 1968, 3143 and J. C. Bailar and H. Italani, J. Am. Chem. Soc., 89, 1592 (1967) and related references. The tristriphenylphosphinechlororuthenium (II) hydride, for example, may be easily prepared by simply reacting the tristriphenylphosphineruthenium (II) dichloride with hydrogen in benzene-ethanol solution. The bistriphenylphosphine-(trichlorostannato)platinum (II) hydride may, if desired, be prepared in situ by reaction of hydrogen, stannous chloride and bistriphenylphosphineplatinum (II) dichloride in an alcoholic solvent such as methanol, the latter being a solvent solely for the catalyst components during in situ formation. The metal-phosphine complexes precursors to the hydride complexes are made by simply reacting a suitable group VIII metal halide with a triaryl phosphine in an alcoholic solvent and recovering the resulting complex therefrom.

In carrying out the process of this invention the amount of catalyst used should be in the range from 1 mg. to 100 mg. per gram of starting material, and preferably 5 to 10 mg. Although no solvent is necessary, inasmuch as the catalyst is generally soluble in the hydrocarbon starting material, nevertheless, inert organic solvents such as toluene, benzene, cyclohexane or heptane may be employed if desired. In some cases use of dimethylsulfoxide or N,N-dimethylacetamide as the solvent causes an increase in rates of isomerization.

The isomerization reaction may conveniently be conducted by dissolving the catalyst in the hydrocarbon starting material under an inert atmosphere such as nitrogen for a period of from 1 to 100 hours at temperatures ranging from about 60° C. to the reflux temperature of the olefinic starting material. Reactions may be run either at atmospheric pressure of nitrogen, high pressure of inert gas to increase olefin boiling point and allow higher reaction temperature, or under hydrogen pressure when it is necessary to convert and/or maintain the catalyst in the hydride form.

The products may readily be recovered from the reaction mixture by known methods, i.e., distillation if volatile, crystallization if solid, etc.

An important advantage of this process is the high degree of selectivity which may be achieved in forming certain isomers. For example, when tristriphenylphosphinechlororhodium (II) hydride is used as the catalyst for isomerization of 4-vinyl-1-cyclohexene, the conjugated 3-ethylidene-1-cyclohexene is formed with a selectivity of better than 92 percent at complete conversion of starting material. When bistriphenylphosphine(trichlorostannato) platinum (II) hydride is used as the catalyst for the isomerization of the same material the non-conjugated 4-ethylidene-1-cyclohexene is formed with a selectivity of 84 percent at 87 percent conversion of 4-vinyl-1-cyclohexene. Other examples of the selectivity in the presence of the above-mentioned ruthenium complex include the selective isomerization of vinylcyclohexane to ethylidenecyclohexane and of vinylcyclopentane to ethylidenecyclopentane despite the fact that the internal isomers, the ethylcyclohexenes and ethylcyclopentenes respectively, are far more stable and are formed in moderate to high yields in isomerization of the vinyl compounds when acids, base and metal catalysts are used. Each of the other catalysts disclosed herein also display varying degrees of selectivity for the above-described isomers and may be substituted for the above catalyst complexes if desired.

The invention will be further illustrated by the following examples. Unless otherwise specified, all parts and percentages are given by weight.

EXAMPLE 1

A series of experiments was carried out whereby 4-vinyl-1-cyclohexene was isomerized using catalysts and reaction conditions set forth in Table I below. In each case the reaction was carried out in a standard glass apparatus in an atmosphere of nitrogen. The diene (4 ml.) was freed from dissolved oxygen by bubbling a vigorous stream of nitrogen through the sample for several minutes. The 4-vinyl-1-cyclohexene was then added to the reaction flask containing 4 mg. of the catalysts. The mixture was warmed by immersion of the flask in a heated oil bath at the indicated temperature, and stirred magnetically for the desired length of time. The product mixtures were analyzed by gas chromatography and identified by their NMR, IR, UV and mass spectra in addition to C,H analysis.

TABLE 1.—SELECTIVE ISOMERIZATION OF 4-VINYL-1-CYCLOHEXENE

| Catalyst [a] | Temp., °C. | Solvent | Reaction time (hrs.) | Isomerization, percent | Exocyclic isomers, percent |
|---|---|---|---|---|---|
| RuCl$_2$(Ph$_3$P)$_3$[b] | 100 | | 41 | 100 | 92 |
| RuCl$_2$(Ph$_3$P)$_3$[b] | 100 | DMA | 24 | 100 | 99 |
| RuHCl(Ph$_3$P)$_3$ | 100 | | 30 | 100 | 95 |
| OsBr$_2$(Ph$_3$P)$_3$[b] | 100 | | 40 | 7.6 | 2.6 |
| OsHCl(Ph$_3$P)$_3$ | 100 | | 40 | 3 | 3 |

[a] The ratio of moles of catalyst/moles of reactant=10$^3$–10$^4$.
[b] The hydride was formed in situ.

Where phosphine complexes, such as tristriphenylphosphineruthenium (II) dichloride, which do not contain a metal-hydrogen bond (i.e., the hydride form) were used, an induction period was observed during which time the complex abstracted hydrogen from the olefin, and the expected color change occurred. The existence of the hydride was proved by isolating the catalyst after the reaction by crystallizing it at low temperature and observing the metal-hydrogen stretching vibration (2050–1800 cm.$^{-1}$) in the infrared. Re-use of the recovered metal hydride complexes in another isomerization reaction showed them to be catalytically active.

EXAMPLE 2

In accordance with the procedures of Example 1, but substituting various cyclic compounds with olefinic side chains and utilizing tristriphenylphosphineruthenium (II) dichloride as the catalyst, varying yields of exocyclic olefins were obtained as outlined in Table 2. The identities of the products were established by NMR, IR, UV and mass spectral analysis and by comparison of retention times on gas chromatographic columns where possible.

The corresponding products for runs A to D of Table 2 were identified as follows: (A) ethylidenecyclohexane; (B) ethylidene cyclopentane; (C) propylidenecyclohexane; and (D) propylidene cyclopentane.

EXAMPLE 3

In accordance with the procedure of Examples 1 and 2, various cyclic compounds with olefinic side chains were isomerized utilizing bistriphenylphosphinecarbonylchloroiridium (I). Vinylcyclohexane gave the exocyclic isomer, ethylidenecyclohexane; vinylcyclopentane gave ethylidenecyclopentane and 4-vinyl-1-cyclohexene gave mixtures of the exocyclic products: cis- and trans-4-ethylidenecyclohexene, and cis- and trans-3-ethylidenecyclohexene. The results are summarized in Table 3.

TABLE 3.—SELECTIVE ISOMERIZATION OF OLEFINS USING IrCl(CO)(Ph$_3$P)$_2$*

| Olefin | Temp., °C. | Reaction time (hrs.) | Product mixture Percent | Percent |
|---|---|---|---|---|
| ⬡—CH=CH$_2$ | 100 | 41 | ⬡=CHCH$_3$  9 | |
| ⬠—CH=CH$_2$ | 90–100 | 41 | ⬠=CHCH$_3$  6 | |
| ⬡(ene)—CH=CH$_2$ | 100 | 135 | ⬡(ene)=CHCH$_3$  49 | ⬡(ene)=CHCH$_3$  16 |
| Same as above | 100 | 205 | Same as above  22 | Same as above  57 |

*An iridium hydride was formed in situ.

EXAMPLE 4

The isomerization of 4-vinyl-1-cyclohexene was carried out using a 20 percent solution of the olefin in 3 M methanolic solution of bistriphenylphosphine(trichlorostannato)platinum (II) hydride. The catalyst was generated in situ from the reaction of bistriphenylphosphineplatinum (II) dichloride and stannous chloride under 100 p.s.i. of hydrogen in a Fisher-Porter tube. The reaction was run under 100 p.s.i. of hydrogen to stabilize the hydride complex. The reaction temperature was 70° C. and the reaction time was 4 hours. After this time 87 percent of the starting diene had isomerized to give cis- and trans-3-ethylidenecyclohexene (72%) and cis- and trans-4-ethylidenecyclohexene (15%). This represents an 83 percent selectivity for unconjugated exocyclics at a conversion of 87 percent.

EXAMPLE 5

In accordance with the procedures of Examples 1 to 3, but using tristriphenylphosphinecarbonylchloroosmium (II) hydride, tristriphenylcarbonylchloroiridium (II) hydride, and tristriphenylphosphinecarbonylrhodium (I) hydride, the same products as in Example 4 were formed from 4-vinyl-1-cyclohexene.

TABLE 2.—SELECTIVE ISOMERIZATION OF OLEFINS USING RuCl$_2$(Ph$_3$P)$_3$*

| | Olefin | Temp., °C. | Reaction time (hrs.) | Isomerization, percent | Exocyclic isomer, percent |
|---|---|---|---|---|---|
| A | ⬡—CH=CH$_2$ | 100 | 46 | 31 | 30 |
| | Same as above | 100 | 112 | 95 | 94 |
| | do | 107 | 70 | 56.5 | 56 |
| B | ⬠—CH=CH$_2$ | 90–100 | 45 | 30 | 25 |
| | Same as above | 90–100 | 165 | 99 | 92 |
| C | ⬡—CH$_2$CH=CH$_2$ | 100 | 45 | 94 | 20 |
| D | ⬠—CH$_2$CH=CH$_2$ | 100 | 45 | 74 | 0.5 |
| | Same as above | 101 | 97 | 93 | 3.0 |

*The ruthenium hydride complex was formed in situ as in Example 1.

EXAMPLE 6

In accordance with the procedure of Example 4, but substituting bistriphenylphosphinepalladium (II) dichloride for bistriphenylphosphineplatinum (II) dichloride, the unconjugated 3-ethylidenecyclohexenes (2%) was formed from 4-vinyl-1-cyclohexene.

EXAMPLE 7

In accordance with the procedure of Example 1, but substituting vinylnorbornene for 4-vinyl-1-cyclohexene and using $RuCl_2(Ph_3P)_3$ at 130° C., the isomeric ethylidenenorbornene was produced. No side reactions were observed.

EXAMPLE 8

The isomerization of 4-vinylcyclohexene-1 was carried out at 70° C. in methanolic solution using 1:5

$$RuCl_2(Ph_3P)_3 : SnCl_2$$

as the catalyst under varying degrees of hydrogen pressure. For example, at 100 p.s.i. of hydrogen little exocyclic was formed and a 13 percent yield of hydrogenated material resulted. At 25 p.s.i. of hydrogen, however, an 8 percent yield of exocyclics was produced with only 2 percent hydrogenation.

The products produced by the process of this invention are useful as monomers in the production of polymers having various properties. For example, ethylidene norbornene is particularly useful in the preparation of ethylene-propylene diene monomers for making elastomers.

What is claimed is:

1. A process for the isomerization of cyclic hydrocarbons having a side chain containing non-exocyclic olefinic unsaturation to form a cyclic hydrocarbon containing a double bond exocyclic to the ring which comprises contacting said cyclic hydrocarbons at a temperature of at least 60° C. with a homogeneous catalyst consisting essentially of a hydrocarbon soluble, coordinatively unsaturated, ligand-stabilized transition metal hydride complex having the formula $$(LR_3)_q X_r MH_z$$

wherein L is nitrogen, phosphorus, or arsenic; R is lower alkyl or mononuclear aryl; X is chlorine, bromine, iodine or $SnCl_3$; M is a group VIII transition metal; H is hydrogen; $q$ is the integer 2 or 3; $r$ is an integer of from 0 to 2; and $z$ is the integer 0 or 1; wherein, when $z$ is 0, the metal hydride complex is formed in situ.

2. The process according to claim 1 wherein the $LR_3$ moiety is triarylphosphine, X is chloro, and M is ruthenium.

3. The process according to claim 1 wherein the $LR_3$ moiety is triphenylphosphine, $q$ is 2, X is $SnCl_3$ and M is platinum.

4. The process according to claim 1 wherein 4-vinyl-1-cyclohexene is selectively isomerized by contact with $RuCl_2(Ph_3P)_3$ or $RuHCl(Ph_3P)_3$ to form predominantly 3-ethylidene-1-cyclohexene.

5. The process according to claim 1 wherein 4-vinyl-1-cyclohexene is selectively isomerized to form predominantly 4-ethylidene-1-cyclohexene in the presence of $PtHSnCl_3(Ph_3P)_2$ under about 100 p.s.i. hydrogen.

6. The process according to claim 1 wherein vinylnorbornene is isomerized to form ethylidene norbornene.

7. The process according to claim 1 wherein vinylcyclohexane or vinylcyclopentane is isomerized to form ethylidenecyclohexane or ethylidenecyclopentane respectively.

8. The process according to claim 1 wherein the catalyst is tristriphenylphosphineosmium (II) dibromide or tristriphenylphosphinechloroosmium (II) hydride.

9. The process according to claim 1 wherein the catalyst is $PtCl_2(Ph_3P)_2$, $PdCl_2(Ph_3P)_2$ or $RuCl_2(Ph_3P)_2$ reacted with stannous chloride alcoholic solution under hydrogen pressure of about 100 p.s.i.

10. A process for the isomerization of cyclic hydrocarbons having a side chain containing non-exocyclic olefinic unsaturation to form a cyclic hydrocarbon containing a double bond exocyclic to the ring which comprises contacting said cyclic hydrocarbons with a homogeneous catalyst consisting essentially of a hydrocarbon soluble, coordinatively unsaturated, ligand-stabilized transition metal hydride complex having the formula $$(CO)(LR_2)_q X_r MH_z$$

wherein L is nitrogen, phosphorus or arsenic; R is lower alkyl or mononuclear aryl; X is chlorine, bromine, iodine or $SnCl_3$; M is a group VIII transition metal; H is hydrogen; $q$ is the integer 2 or 3; $r$ is an integer of from 0 to 2; and $z$ is the integer 0 or 1; wherein, when $z$ is 0, the metal hydride complex is formed in situ.

11. The process according to claim 10 wherein the $LR_3$ moiety is triphenylphosphine, X is chloro and M is ruthenium.

12. The process according to claim 10 wherein the $LR_3$ moiety is triphenylphosphate, $q$ is 2, X is chlorine and M is iridium.

13. The process according to claim 10 wherein the catalyst is bistriphenylphosphinecarbonylchloroiridium (I) chloride, tristriphenylphosphinecarbonyliridium (I) hydride or tristriphenylcarbonylrhodium (I) hydride.

References Cited

UNITED STATES PATENTS

| | | | |
|---|---|---|---|
| 3,352,938 | 11/1967 | Plonsker et al. | 260—683.2 |
| 3,409,702 | 11/1968 | Plonsker et al. | 260—683.2 |
| 3,514,497 | 5/1970 | Hughes | 260—683.2 |
| 3,471,581 | 10/1969 | Maxfield | 260—666 |
| 3,458,547 | 7/1969 | Coffey | 260—666 A |
| 3,375,287 | 3/1968 | Tinsley et al. | 260—666 A |

DELBERT E. GANTZ, Primary Examiner

V. O'KEEFE, Assistant Examiner

U.S. Cl. X.R.

260—666 PY